United States Patent [19]

Raymond

[11] Patent Number: 5,174,686
[45] Date of Patent: Dec. 29, 1992

[54] PIPE-LAYING APPARATUS

[76] Inventor: Gene Raymond, Star Rte. Box 132A, Swansea, S.C. 29160

[21] Appl. No.: 709,612

[22] Filed: Jun. 3, 1991

[51] Int. Cl.[5] .............................................. F16L 1/028
[52] U.S. Cl. ..................................... 405/184; 405/174
[58] Field of Search .............. 405/154, 174, 180, 183, 405/184

[56] References Cited

U.S. PATENT DOCUMENTS

| 319,958 | 12/1884 | Hughes . | |
|---|---|---|---|
| 340,505 | 4/1886 | Hastings . | |
| 3,201,944 | 8/1965 | Christensen | 405/184 |
| 3,214,920 | 11/1965 | Jacobs | 405/184 |
| 3,323,313 | 6/1967 | Owens | 61/72.6 |
| 3,371,495 | 3/1968 | Kaercher | 405/184 |
| 3,523,425 | 8/1970 | Pierce, Jr. | 61/72.6 |
| 3,914,948 | 10/1975 | Kaercher | 405/184 |
| 4,050,260 | 9/1977 | Lemay | 61/72.6 |
| 4,146,347 | 3/1979 | Woods | 405/184 |
| 4,825,569 | 5/1989 | Porter | 37/142.5 |

Primary Examiner—David H. Corbin
Attorney, Agent, or Firm—Michael A. Mann

[57] ABSTRACT

A pipe laying apparatus comprising a frame mounted on two or more wheels, with a motor and a cutting disk for cutting a narrow slit in the ground. In one embodiment, the apparatus has a blade following the disk and having a conduit on the end with a nozzle on one end of the conduit that issues a jet of water into the bottom of the slit to form a channel. The pipe is attached to the other end of the conduit and is pulled into position in the channel as the apparatus advances. In an alternate embodiment, the apparatus has a winch and pulley used to deploy a wire into the slit as the apparatus is moved forward. The other end of the wire is attached to a nozzle and conduit with the pipe attached in turn to the conduit. When the apparatus is stoppped, the winch rewinds the wire while the nozzle sprays a jet of water in the direction of movement to form the channel and allow the pipe to be easily pulled into position.

15 Claims, 4 Drawing Sheets

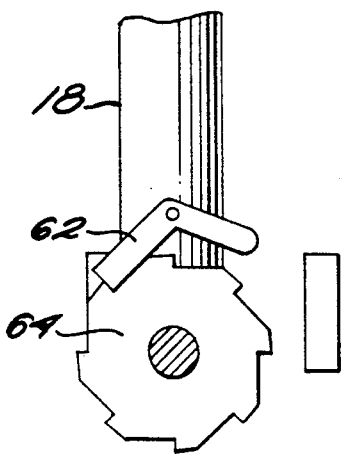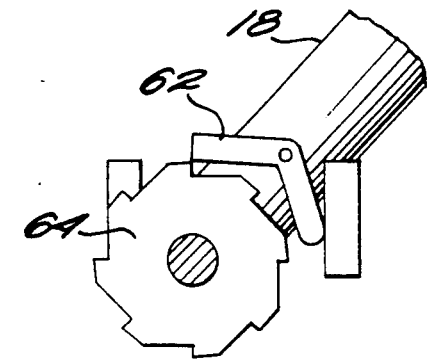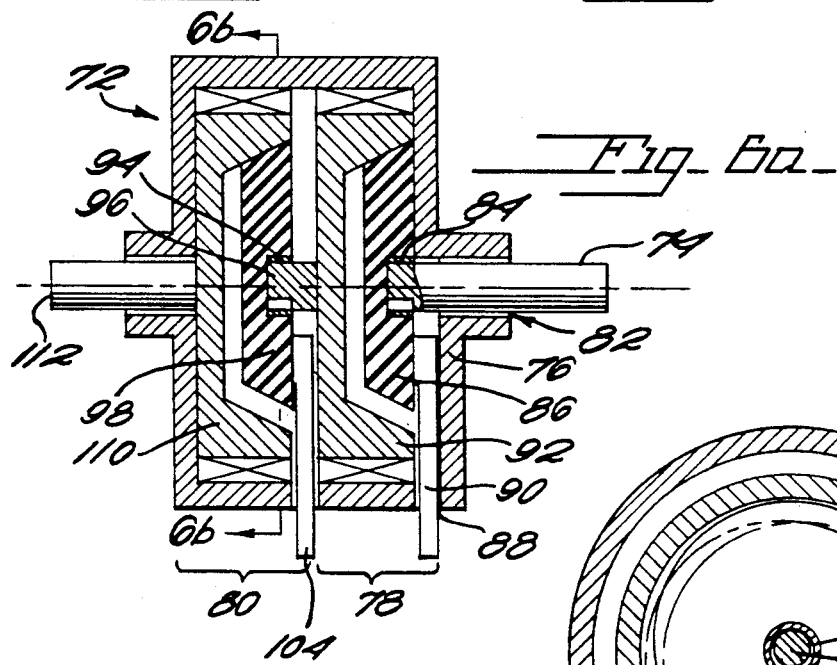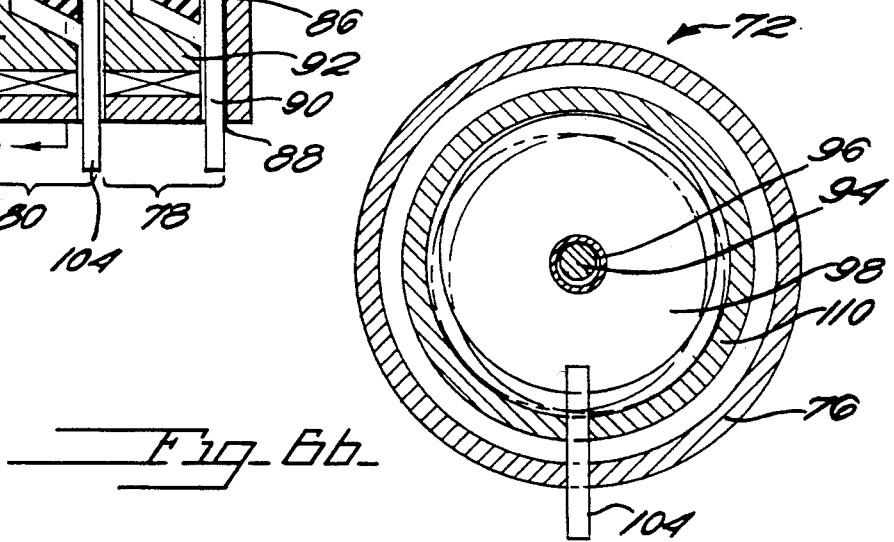

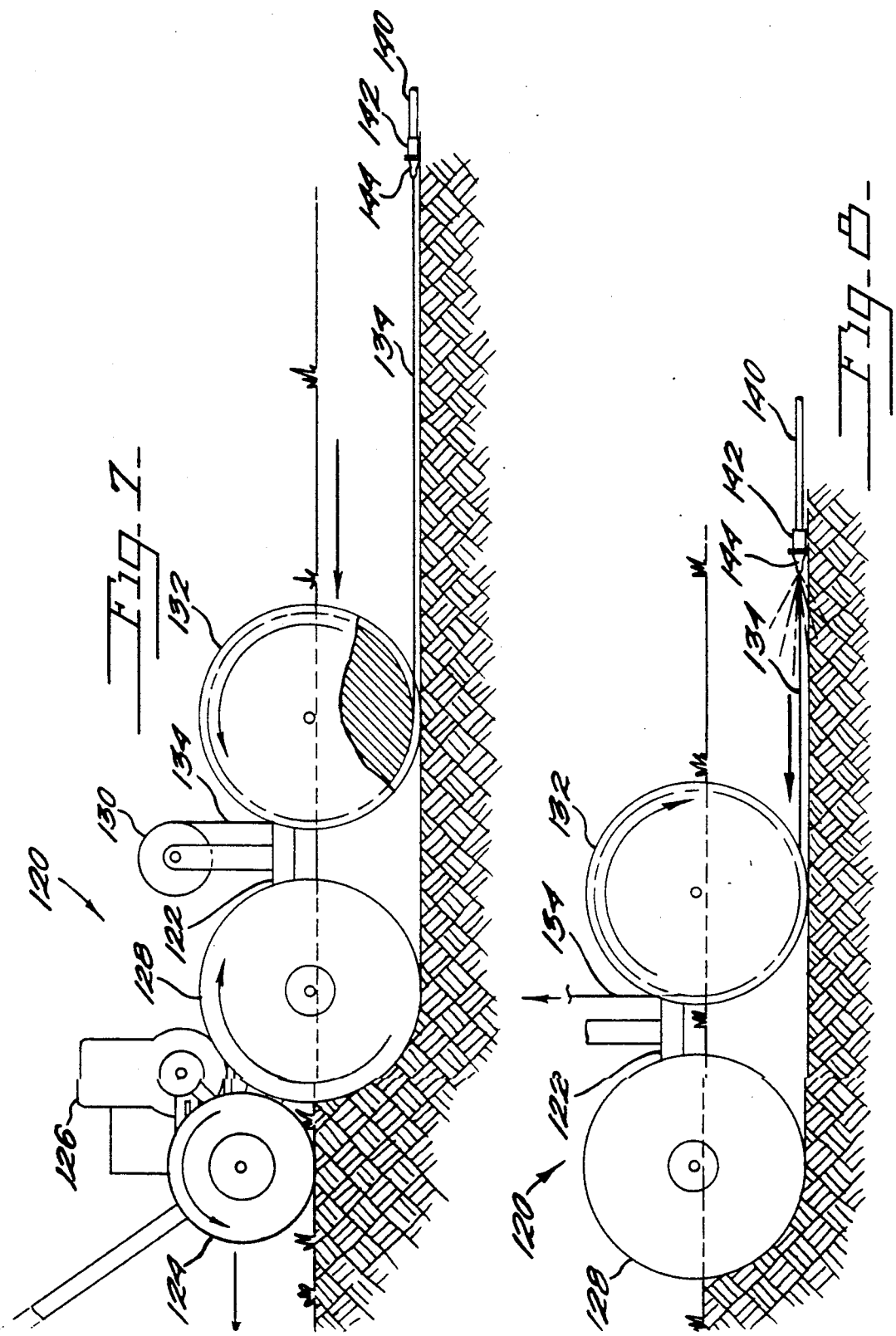

PIPE-LAYING APPARATUS

BACKGROUND OF THE INVENTION

1. Field of the Invention

The present invention relates to apparatus for laying pipe and cable in the ground. In particular, the present invention relates to apparatus for pulling a pipe or cabling through the ground into position.

2. Discussion of Background

Pipes and other small diameter conduits and cables are placed beneath the surface of the ground for a variety of purposes. One common purpose is the establishment of an underground irrigation system for crops or lawns. Typically, a narrow, shallow trench is dug and polyvinylchloride (PCV) pipe laid therein. Then the pipe is covered with soil to fill the trench. Telephone and television cable may also be installed just beneath the surface of the ground. Although the task of digging the trench can be done with a pick and shovel, there exist apparatus for laying pipe and cable.

In U.S. Pat. No. 3,323,313 issued to Owens, there is disclosed a device that lays pipe by pulling it through the ground following a disk that makes a cut in the ground and a blade that separates the two sides of the cut to make room for the pipe. Water has long been known as useful for facilitating the cutting of a channel in the ground for piping. See U.S. Pat. Nos. 340,505 and 310,058 issued to Hastings and Hughes, respectively, for examples of the use of water to lubricate cutters.

However, there remains a need for a small, effective pipe laying apparatus that disturbs the surface of the ground as little as possible.

SUMMARY OF THE INVENTION

According to its major aspects and broadly stated, the present invention is an apparatus for laying a pipe beneath the surface of the ground. The apparatus comprises a frame with two or more wheels and a motor, means carried by the frame for forming a channel in the ground just large enough to accommodate the pipe, and means for pulling the pipe into position along the channel. The channel is formed in part by directing a stream of fluid, such as water or air, from a nozzle in the direction the pipe is to be laid. The channel is also partly formed by one or more cutting disks attached to the frame and turned by the motor, which establishes the direction of the channel and provides a space for soil to be washed out of the way.

. There are two alternate embodiments of the pulling means. In one, a blade is attached to the frame coplanar and following the cutting disk (disks) and a conduit is attached to the blade. The nozzle for directing the jet of fluid is attached to one end of the conduit and the other end of the conduit pulls the pipe. The conduit is in fluid communication with a source of the fluid.

In the other embodiment of the pulling means, there is a winch attached to the frame and driven by the motor. A wire is deployed by the winch into the slit cut by the disks, guided by a free-wheeling pulley, as the apparatus advances. The conduit with nozzle and pipe are attached to the remote end of the wire. When the apparatus is stopped and the winch rewinds the wire, the wire will in turn pull the nozzle in the direction the pipe is to be laid, the nozzle using the fluid jet to form a channel for the pipe that follows.

The output of the motor becomes the input shaft of a friction-drive, speed-reducing clutch comprising a housing and one or more sets of the following in series: a driver cone in the housing which is engaged by the input shaft of the motor, means for preventing the rotation of the driver cone but allowing its revolution; a driven cone, a portion of which is engaged by the driver cone so that the driven cone rotates as successive portions of the driven cone are engaged by the revolution of the driver cone; and an output shaft rotatably attached to the driven cone.

An important feature of the present invention is the use of a jet of a fluid such as water or air to form a channel in the ground for the pipe. This feature makes it easier to pull the pipe through the ground because it forms and lubricates the channel and it avoids the need to cut and then refill a dug trench. Especially in combination with the disk for cutting a slit, the fluid jet can force soil out of the way, compressing it to the sides and up out of the way into the slit.

Another important feature of the present invention is the disk itself and especially its adjustability, moving it up or down for shallower or deeper cuts. A larger disk can also be selected for deeper cuts and greater mechanical advantage; two parallel disks can be used for especially dense soils, such as clay. It makes a narrow slit that obviates the need to restore the surface of the soil. Thus, piping can be laid quicker from start to finish.

Still another feature of the present invention is the pulling means. There are two embodiments: one with a blade attached to the frame of the apparatus that pulls the conduit with its nozzle at one end and the pipe at the other end; the second with a winch and pulley for deploying a wire. As the apparatus moves forward the pulley deploys a wire into the slit. The conduit is attached to the end of the wire. When the apparatus is stopped and the pulley wound, it pulls the conduit and pipe forward toward it, assisted by the jet of fluid from the nozzle forming the channel as the conduit moves. This feature in either embodiment preserves the relationship between the nozzle and the slit made by the disk.

Yet another feature of the present invention is the speed-reducing, friction clutch. The clutch is a simple, few-moving-part adaptation of a harmonic drive that reduces the speed of rotation of a standard motor to a usable rate and power level.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 5a and 5b show a detailed view taken along line 5—5 of FIG. 2 of the ratchet according to a preferred embodiment of the present invention;

FIG. 6a and 6b are side and end cross sectional views of the speed-reducing friction clutch according to the present invention;

FIG. 7 is a side view of an alternate embodiment of the pipe laying apparatus according to the present invention deploying a wire; and FIG. 8 is a side view of the apparatus shown in FIG. 7 retrieving the wire.

DETAILED DESCRIPTION OF A PREFERRED EMBODIMENT

Figure 1:
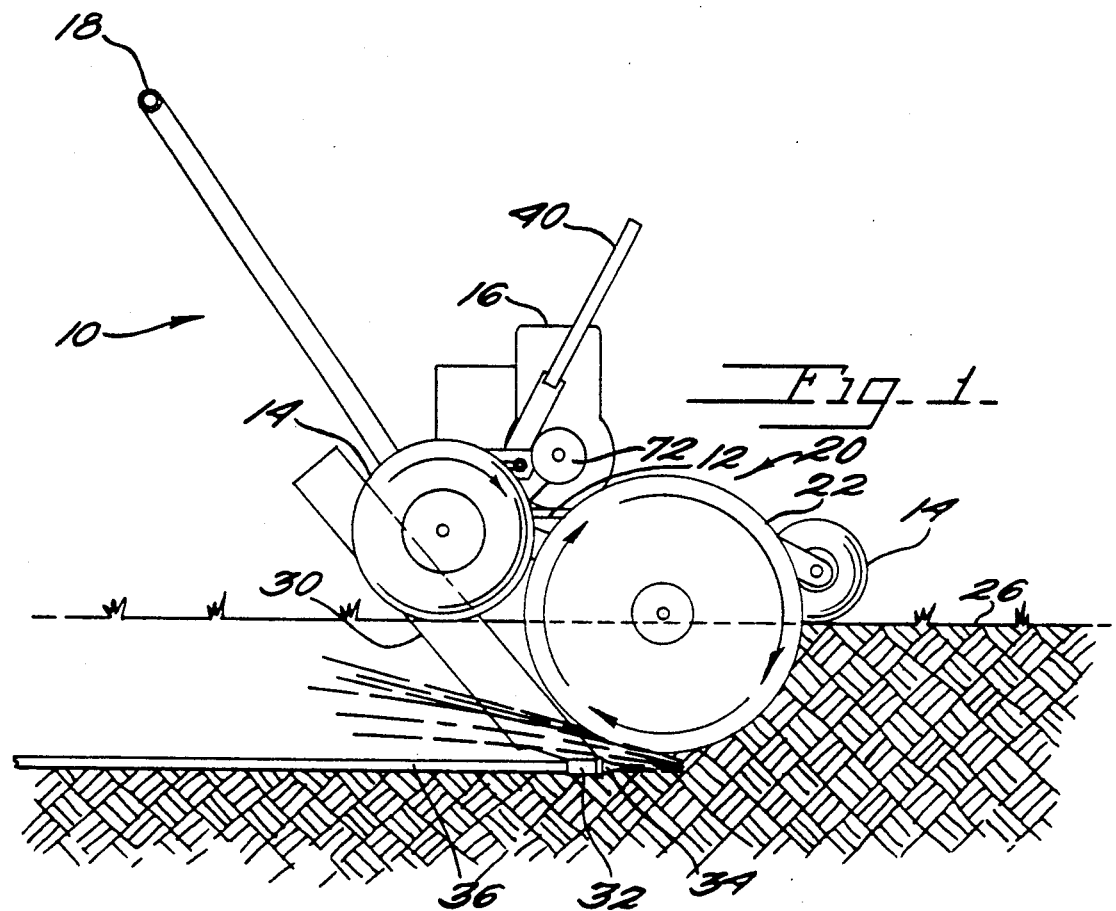
FIG. 1 is a side view of a pipe laying apparatus according to a preferred embodiment of the present invention.
Figure 2:
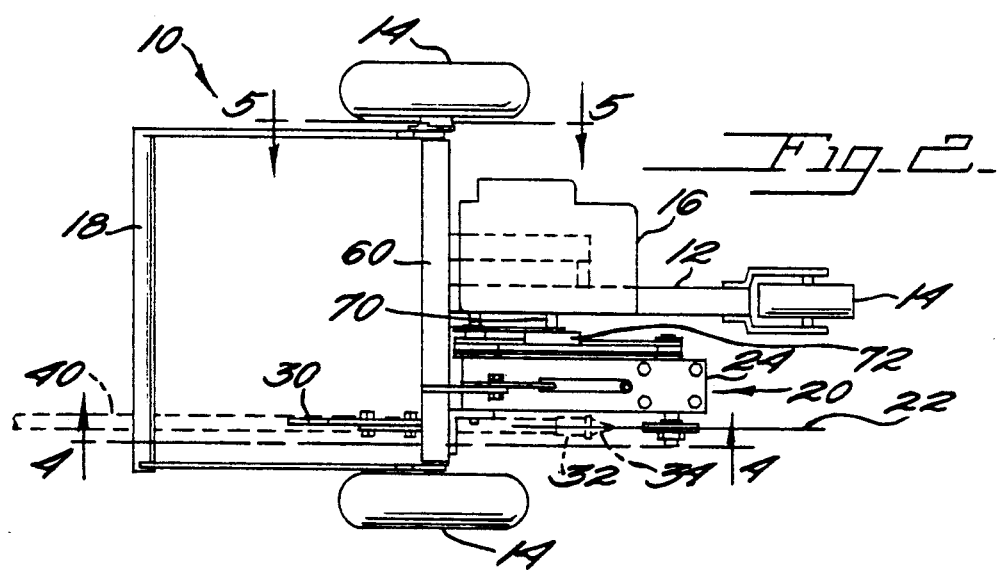
FIG. 2 is a top view of the pipe laying apparatus shown in FIG. 1.
Figure 3:
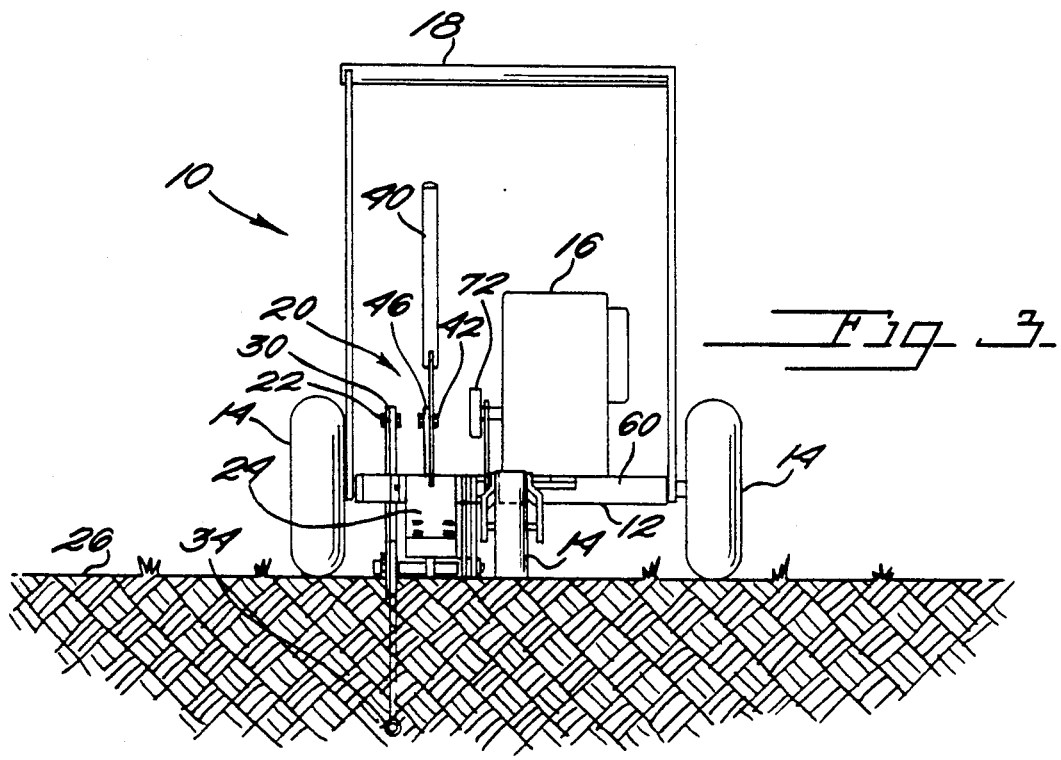
FIG. 3 is an front view of the pipe laying apparatus shown in FIG. 1.

Referring now to FIGS. 1, 2 and 3, there is illustrated an apparatus 10 for laying a pipe or other small diameter tube for irrigation, a cable, or a conduit for protecting a cable in the ground at a shallow depth, such as a few inches to one foot, but possibly deeper if the apparatus is sized accordingly. Essentially the apparatus cuts a narrow, vertical slit in the ground and pulls a conduit with a nozzle after it, the nozzle directing a jet of fluid such as water in the direction of the slit to clear a channel for the pipe. The pipe is also pulled into position by the apparatus and may serve as the fluid-bearing conduit.

Apparatus 10, one of two embodiments that will be described herein, comprises a frame 12 having at least two wheels 14, three being preferred, rotatably mounted to frame 12. A motor 16 is mounted on the frame and drives wheels 14, in the conventional manner, and other components as will be herein described. A handle 18 is used by the operator of apparatus 10 to direct it and, as also will be described, to start and stop it and drive wheels 14.

Attached pivotally to frame 12 is a cutting assembly 20 comprising at least one cutting disk 22 rotatably secured to a cutting arm 24. In most soils a single cutting disk 22 is sufficient; in dense soils, two, closely-spaced disks are preferred. Cutting disk 22 makes a narrow slit in the ground 26 to approximately the desired depth the pipe is to be laid. Disk 22 makes a slit narrow enough so as to obviate the need to refill the cut. The purpose of the slit is to partially clear the way for the pipe, to establish a preferred direction for the pipe, and to provide a space for displaced dirt as the fluid jet forms a channel in the ground and to make a clear slot in the soil.

Attached rigidly to frame 12, in line with cutting disk 22 is a blade 30. Blade 30 should be approximately the same width as and coplanar to disk 22. Blade 30 holds a conduit 32 having a nozzle 34 at one end oriented to direct a jet of fluid in the direction the pipe is to be laid; i.e. parallel to the plane of disk 22. A pipe 36 is attached to the other end of conduit 32. The far end of pipe 36 (not shown) is attached to a source of fluid, which is preferably water but may be air, steam or other non-toxic fluid. If pipe 36 is not intended or suitable for carrying the fluid, such as would be the case for laying television cable for example, then conduit 32 can pull a hose attached to and following the side of blade 30.

Figure 4:
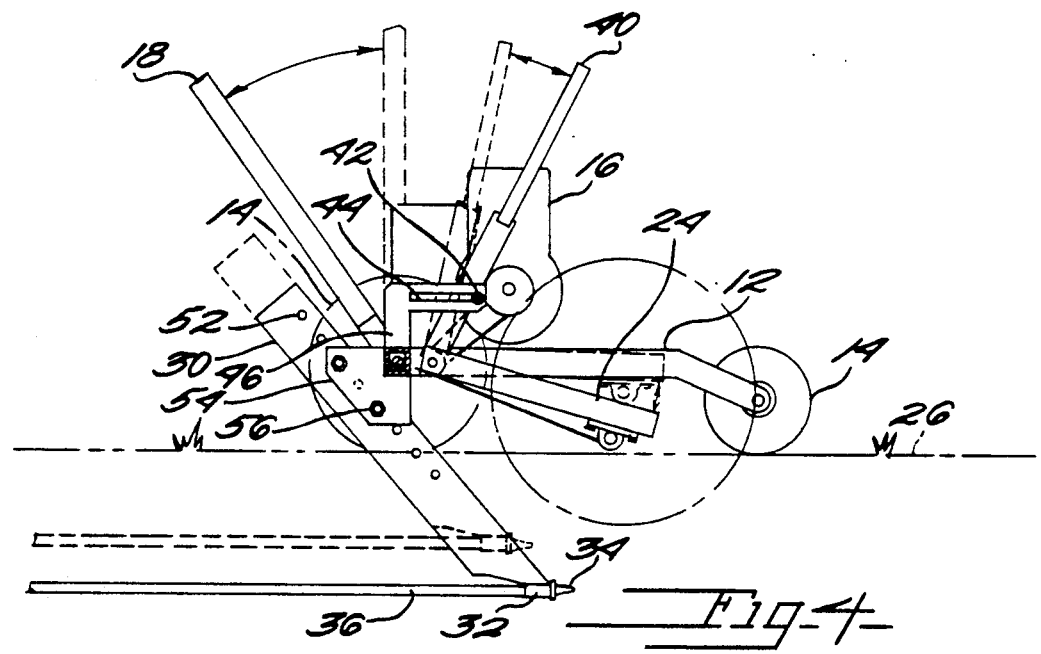
FIG. 4 is a partially cut away side view of the apparatus shown in FIG. 1, taken along line 4—4 of FIG. 2, showing the movement of the handle, and the adjustability of the blade and disk.

FIG. 4 shows several adjustments that can be made to apparatus 10 in its preferred embodiment. By moving cutting arm 24 using lever 40, disk 22 can be raised or lowered to cut a slit at the desired depth. As lever 40 is moved forward or backward, its travel is guided by a bolt 42 riding in a slot 44 in a guide bar 46. Guide bar 46 is rigidly attached to frame 12.

Blade 30 is also adjustable, shown here with a series of holes 52 to allow bolting to a frame plate 54, which is welded to frame 12, with two or more bolts 56 for rigid attachment. Slots in blade 30, of course, rather than holes 52, can be used as long as blade 30 is securely attached to frame plate 44.

Handle 18 rotates about an axle 60 between the two rear wheels 14. Attached to handle is a member 62 that moves with handle 18 and engages and disengages a ratchet 64 (see FIGS. 5a and 5b) as it moves from one position to another. When ratchet 64 is engaged, preferably by pushing handle 18 forward (as in FIG. 5a), apparatus 10 is advanced by motor 16. When ratchet 64 is disengaged, preferably by pulling handle 18 rearward (as in FIG. 5b), apparatus 10 stops, although motor 16 continues to run.

The speed of apparatus 10 is necessarily slow for good control. The output shaft 70 of motor 16 will turn at a rate that is normally too fast for apparatus 10 and may be geared down in a number of ways known to those skilled in the art. In the preferred embodiment of the present invention, however, a speed-reducing frictional clutch 72 is provided. The input shaft 74 of clutch 72 is the output shaft 70 of motor 16. As illustrated in FIGS. 6a and 6b, clutch 72 comprises a housing 76 with one or more sets of cones therein in series. Two sets, a first set 78 and a second set 80 are shown in FIG. 6a. Input shaft 74 penetrates housing 76 at 82 and is thereafter reduced to a smaller radius with its axis off set from the original axis of input shaft 74. The end of input shaft 74 seats in a bushing 84 in a driver cone 86. Bushing 84 has a radius and an axis corresponding to the eccentric end of input shaft 74 before reduction. Input shaft 74 will precess about the original axis of rotation of output shaft 70, both rotating and revolving. A first key lock 90 is attached firmly to driver cone 86 and extends outside of housing 76 at penetration 88 and thereby prevents driver cone 86 from rotating about its axis. However, driver cone 86 will revolve because of the engagement between the eccentrically reduced input shaft 74 and bushing 84. Driver cone is preferably a male, driver cone nested within a female, driven cone 92 which has a rotational axis corresponding the input shaft 74 before its reduction. Driver cone 86 engages only a portion of driven cone at one time and moves over successive portions, returning repeatedly to its original position, and rotating driven cone 92 about its axis. Driver and driven cones 86, 92 frictionally engage each other; one is preferably made of rubber or a rubber-like material and the other of metal or ceramic. Most preferably, driver cone 86 is made of rubber, driven cone 92 is made of a metal and bushing 84 is made of bronze.

Driven cone 92 has an output shaft 94 that has an axis eccentrically reduced toward its end in the same fashion as input shaft 74. Second set 80 parallels first set 78; output shaft 94 seats in a bushing 96 in a male driver cone 98, held in place by a key lock 104, so that it revolves in a female driven cone 110. Driven cone 110 has an output shaft 112 that is coupled to wheels 14 in the usual manner, its speed reduced by the combined ratios of the circumferences of the two driver cones 86, 98, to the two driven cones 92, 110.

In use, motor 16 is started and handle 18 pushed forward so that ratchet 64 is engaged by member 62 to propel apparatus 10. As apparatus 10 moves forward, disk 22, also turned by motor 16, cuts a slit in the ground in the forward direction. Blade 30, spaced near and directly behind disk 22, follows pulling pipe 36 attached to conduit 32. The other end of conduit 32 directs a nozzle with a jet of water or other fluid along the direction of motion into the base of the slit to clear a channel for the following pipe 36. The soil from the channel is pushed aside by the jet and the motion of the conduit and nozzle, much of it washing into the slit above. As the apparatus is moved, it pulls pipe 36 into position without excavation of the soil and without the need to repair the soil.

FIGS. 7 and 8 show an alternate embodiment of the present invention. They illustrate an apparatus 120 similar to apparatus 10, with a frame 122, wheels 124 and motor 126. Apparatus 120 also has a cutting disk 128. However, unlike apparatus 10, apparatus 120 has no blade. Rather, it has a winch 130 operated off motor 126 and a free-wheeling pulley 132 that together deploy a wire 134 into the slit made by disk 128 as apparatus is pulled forward (to the left in FIG. 7). Pulley 132 guides wire 134 into position in the slit. To the rearward is pipe 140 attached to a conduit 142 with a nozzle 144. Pipe 140 is attached to a source of water or other fluid. When apparatus 120 has deployed a length of wire 134 along a run, it is stopped, the wheels locked, and winch 130 pulls wire 134 about pulley 132, thereby reeling in wire 134 and pulling with it conduit 142 and pipe 140. Meanwhile, nozzle 144 issues a jet of water to form a channel for the following pipe 140 helping to pull it into position.

It will be apparent to those skilled in the art that many changes and substitutions can be made to the preferred embodiment herein described without departing from the spirit and scope of the present invention as defined by the appended claims.

What is claimed is:

1. An apparatus for laying a pipe beneath the surface of the ground, said apparatus comprising:
   a frame;
   means carried by said frame for forming a channel in said ground, said channel dimensioned to accommodate said pipe, said channel formed in part by directing a jet of fluid in the direction said pipe is to be laid;
   means for cutting a slit in said ground in the direction said pipe is to be laid, said slit having approximately the same depth to which said pipe is to be laid; and
   means carried by said frame for pulling said pipe into position along said channel.

2. The apparatus as recited in claim 1, wherein said forming means further comprises:
   a conduit below said surface of said ground, said conduit attached to said pulling means and in fluid communication with a source of said fluid, said conduit adapted for securing one end of said pipe; and
   a nozzle on the end of said conduit, said nozzle adapted to direct a jet of said fluid from said conduit in the direction said pipe is to be laid.

3. The apparatus as recited in claim 1, wherein said forming means further comprises:
   a conduit below said surface of said ground, said conduit attached to said pulling means, spaced apart from said cutting means and in fluid communication with a source of said fluid, said conduit adapted for securing one end of said pipe; and
   a nozzle on the end of said conduit, said nozzle adapted to direct a jet of said fluid from said conduit in the direction said pipe is to be laid, said nozzle aligned with said cutting means.

4. The apparatus as recited in claim 1, wherein pulling means further comprises a blade attached to said frame and said forming means further comprises:
   a conduit below said surface of said ground, said conduit attached to said blade, spaced apart from said cutting means and in fluid communication with a source of said fluid, said conduit adapted for securing one end of said pipe; and
   a nozzle on the end of said conduit, said nozzle adapted to direct a jet of said fluid from said conduit in the direction said pipe is to be laid and aligned with said cutting means.

5. The apparatus as recited in claim 1, wherein said pulling means further comprises a wire and means for deploying a wire, and said forming means further comprises:
   a conduit below said surface of said ground, said conduit attached to said wire and in fluid communication with a source of said fluid, said conduit adapted for securing one end of said pipe; and
   a nozzle on the end of said conduit, said nozzle adapted to direct a jet of said fluid from said conduit in the direction said pipe is to be laid and aligned with said cutting means.

6. The apparatus as recited in claim 1, wherein said pulling means and said channel forming means are in the same plane and the direction said pipe is to be laid also lies in said plane.

7. The apparatus as recited in claim 1, further comprising:
   a motor mounted on said frame;
   at least two wheels rotatably mounted to said frame and responsive to said motor, said motor propelling said apparatus.

8. The apparatus as recited in claim 7, further comprises means for adjusting the speed of said motor.

9. An apparatus for laying a pipe beneath the surface of the ground, said apparatus comprising:
   a frame;
   a motor mounted on said frame;
   means for adjusting the speed of said motor;
   at least two wheels rotatably mounted to said frame and responsive to said motor, said motor propelling said apparatus;
   means carried by said frame for pulling said pipe into position, said pulling means moving in the direction said pipe is to be laid;
   a conduit below said surface of said ground, said conduit attached to said pulling means and in fluid communication with a source of fluid, said conduit adapted for securing one end of said pipe; and
   a nozzle on the end of said conduit, said nozzle adapted to direct a jet of fluid from said conduit in the direction said pipe is to be laid, said jet forming a channel dimensioned to accommodate said pipe, said pulling means and the direction of said jet of fluid from said nozzle being in the same plane,
   wherein said motor has an input shaft, said input shaft rotating on its axis, and said adjusting means has
   a housing,
   a driver cone within said housing, said input shaft engaging said driver cone,
   means for preventing the rotation of said driver cone but allowing the revolution of said driver cone,
   a driven cone within said housing, said driver cone engaging a portion of said driven cone and rotating in response to the successive engagement of different portions of said driven cone by the revolution of said driver cone, and an output shaft, said output shaft attached to said driven cone, said output shaft rotating in response to the rotation of said driven cone.

10. The apparatus as recited in claim 9, further comprising means for cutting a slit in said ground, said channel and said slit being mutually parallel.

11. The apparatus as recited in claim 10, wherein said cutting means is at least one disk.

12. The apparatus as recited in claim 11, wherein said at least one disk is driven by said motor.

13. An apparatus for laying a pipe beneath the surface of the ground, said apparatus comprising:

a frame;

a motor mounted on said frame;

at least two wheels rotatably mounted to said frame and responsive to said motor, said motor propelling said apparatus;

means carried by said frame for pulling said pipe into position, said pulling means moving in the direction said pipe is to be laid;

a conduit below said surface of said ground, said conduit attached to said pulling means and in fluid communication with a source of fluid, said conduit adapted for securing one end of said pipe;

a nozzle on the end of said conduit, said nozzle adapted to direct a jet of fluid from said conduit in the direction said pipe is to be laid, said jet forming a channel dimensioned to accommodate said pipe, said pulling means and the direction of said jet of fluid from said nozzle being in the same plane; and at least one disk for cutting a slit in said ground, said channel and said slit being mutually parallel, said at least one disk attached to said frame and turned by said motor, said at least one disk spaced apart from said pulling means;

wherein said pulling means further comprises a blade attached to said frame, said conduit attached to said blade, said pulling means having a wire and means for deploying a wire, said conduit attached to said wire, said pulling means having a pulley coplanar with said at least one disk, winch means for pulling said wire, and a wire attached to said winch means, said winch driven by said motor, said wire being deployed into said slit by said winch as said apparatus is moved in the direction said pipe is being laid, and said winch rewinding said wire, and said nozzle directing said jet in the direction said pipe is being laid to form said channel, said winch pulling said wire and thereby said conduit through said channel.

14. The apparatus as recited in claim 13, wherein said motor further comprises means for adjusting the speed of said motor.

15. The apparatus as recited in claim 13, wherein said motor has a shaft, said shaft rotating on its axis, and said adjusting means further comprises:

a housing;

a driver cone within said housing, said shaft engaging said driver cone;

means for preventing the rotation of said driver cone but allowing the revolution of said driver cone;

a driven cone within said housing, said driver cone engaging a portion of said driven cone and rotating in response to the successive engagement of different portions of said driven cone by the revolution of said driver cone; and an output shaft, said output shaft attached to said driven cone, said output shaft rotating in response to the rotation of said driven cone.

* * * * *